US007110836B2

(12) United States Patent
Sturm et al.

(10) Patent No.: US 7,110,836 B2
(45) Date of Patent: Sep. 19, 2006

(54) CONTROLLABLE APPLIANCE ARRANGEMENT

(75) Inventors: Thomas Sturm, Kirchheim (DE); Guido Stromberg, München (DE)

(73) Assignee: Infineon Technologies AG, Munich (DE)

( * ) Notice: Subject to any disclaimer, the term of this patent is extended or adjusted under 35 U.S.C. 154(b) by 0 days.

(21) Appl. No.: 10/930,731

(22) Filed: Aug. 31, 2004

(65) Prior Publication Data

US 2005/0096760 A1    May 5, 2005

(30) Foreign Application Priority Data

Sep. 3, 2003    (DE)    ................. 103 40 627

(51) Int. Cl.
| G05B 15/00 | (2006.01) |
| G05B 11/01 | (2006.01) |
| G05B 19/18 | (2006.01) |
| G05B 23/02 | (2006.01) |
| G06F 9/00 | (2006.01) |
| G06F 17/00 | (2006.01) |
| G06F 3/00 | (2006.01) |

(52) U.S. Cl. .................. 700/83; 700/14; 700/18; 700/19; 700/65; 715/740; 715/749; 340/3.31; 340/3.32; 340/3.7

(58) Field of Classification Search ............. 700/9, 700/11–14, 17–19, 65, 66, 83, 302; 340/3.1, 340/3.9, 3.3–3.32, 3.43, 3.44, 3.7, 3.71; 715/740, 715/749

See application file for complete search history.

(56) References Cited

U.S. PATENT DOCUMENTS

| 5,237,305 A | * | 8/1993 | Ishikuro et al. ........ 340/286.01 |
| 5,745,049 A | * | 4/1998 | Akiyama et al. ...... 340/870.17 |
| 6,198,079 B1 | * | 3/2001 | Essig ........................ 219/497 |
| 6,259,706 B1 | * | 7/2001 | Shimada ..................... 370/466 |
| 6,380,866 B1 | * | 4/2002 | Sizer et al. ............ 340/825.69 |
| 6,507,762 B1 | * | 1/2003 | Amro et al. .................. 700/83 |
| 6,636,151 B1 | * | 10/2003 | Busick ....................... 340/521 |
| 6,731,201 B1 | * | 5/2004 | Bailey et al. .......... 340/310.01 |
| 6,778,868 B1 | * | 8/2004 | Imamura et al. .............. 700/79 |
| 6,791,467 B1 | * | 9/2004 | Ben-Ze'ev ............ 340/825.69 |
| 6,848,140 B1 | * | 2/2005 | Cho ............................. 8/159 |
| 6,919,790 B1 | * | 7/2005 | Kanazawa ................. 340/5.21 |
| 6,967,565 B1 | * | 11/2005 | Lingemann ............ 340/310.11 |
| 2001/0039460 A1 | | 11/2001 | Aisa |
| 2002/0111698 A1 | * | 8/2002 | Graziano et al. |
| 2003/0083758 A1 | * | 5/2003 | Williamson |
| 2005/0085193 A1 | * | 4/2005 | Stromberg et al. ............ 455/68 |

FOREIGN PATENT DOCUMENTS

| JP | 2001224083 A | * | 8/2001 |
| WO | 03/071366 |   | 8/2003 |

* cited by examiner

Primary Examiner—Crystal J. Barnes
(74) Attorney, Agent, or Firm—Dicke, Billig & Czaja, PLLC

(57) ABSTRACT

A transmission/reception device is provided merely as an embedded system, and a domestic appliance control program and/or an industrial appliance control program is/are transferred from the transmission/reception device to an external control apparatus, and the latter is used to control the appliances. In addition, the appliances contain at least one sensor for recording state information about the respective appliance, the recorded sensor variables being transferred to the external control apparatus.

23 Claims, 5 Drawing Sheets

CONTROLLABLE APPLIANCE ARRANGEMENT

CROSS REFERENCE TO RELATED APPLICATIONS

This Utility Patent Application claims priority to German Patent Application No. DE 103 40 627.1, filed on Sep. 3, 2003, which is incorporated herein by reference.

FIELD OF THE INVENTION

The invention relates to a controllable domestic appliance arrangement and/or a controllable industrial appliance arrangement and also to a control system for controlling a domestic appliance arrangement and/or industrial appliance arrangement.

BACKGROUND

Household appliances and industrial appliances, such as refrigerators, washing machines, dishwashers, heating systems and so on, are provided, for reasons of cost, with simple control elements, such as rotary switches or pushbuttons, and simple displays, such as light emitting diodes, luminous symbols, digits, liquid crystal display elements, which are normally adequate for normal use of the household appliances and industrial appliances.

These control elements, which represent a simple user interface, are not designed for the scenarios and situations below, however.

a) Fault states:
  If a fault arises in the household appliance, only inadequate information can be displayed to a user of the household appliance or industrial appliance, for example by displaying a prescribed symbol sequence, for example in the case of a washing machine "Err27" on a liquid crystal display, if there is one, or by using a flashing warning lamp.
  In both cases, the type of fault and a correct reaction to the occurrence of the fault which a user might take can be communicated to the user only very rudimentarily and inadequately.

b) Basic configurations:
  Individual user-definable changeover of factory states on the household appliances or on the industrial appliances is often not possible at all or is possible only in a very complex and hence user-unfriendly fashion, for example by simultaneously pressing a plurality of pushbuttons or particular key combinations or by pressing prescribed key sequences.
  In this complex manner, it is possible, for example on known appliances, to set a time of day, the type of beeping noises when a prescribed task has ended, for example when a wash program has ended on a washing machine, or the volume of signals output by the household appliance or by the industrial appliance, etc.

c) Data querying:
  There is normally no provision at all for querying system states for the household appliance or for the industrial appliance. For example, a user of a washing machine has to date not normally been able to query the degree of filter soiling, the degree of calcification or a flow rate for water in the washing machine.
  Besides such maintenance queries, there are also often regular useful-data queries, such as a query regarding the consumption of water, power, heating power, which, on the basis of the prior art, normally needs to be done manually by a service engineer.

One possible solution to this problem is to fit or provide large-format data display units and keyboards or touch sensitive screens (touch screens) in the household appliance or in the industrial appliance. This solution is normally too costly, however, which means that often only the control elements described above are provided for normal operation of the household appliance or industrial appliance.

The resultant drawbacks for the user of such an appliance are particularly as follows:

a) Lack of state querying options:
  Since it is not possible to query a state for the household appliance or for the industrial appliance, it is not possible to identify impending system failures or maintenance cases for the household appliance or industrial appliance early, which results later, when the appliance actually fails, in an increased time involvement, financial involvement and possibly increased material involvement for rectifying the damage.
  Particularly in the industrial environment, the time involvement on account of failure of an industrial appliance may be particularly critical.

b) Inadequate fault displays:
  Since the fault displays in the household appliance or in the industrial appliance can often be comprehended by a user only after studying the associated appliance manual or not at all, costly and time-consuming employment of service personnel occurs more frequently than would actually be necessary.

c) Complicated and missing configuration changes:
  The complicated procedure for changing a setting on the household appliance or on the industrial appliance restricts user convenience to a considerable degree, and hence the sales value of the household appliance or industrial appliance is reduced considerably.

When complex and hence expensive user interfaces are fitted, such as a large-area screen, a large keyboard, a trackball, touch sensitive surfaces etc., the following drawbacks result, in particular:

a) High production costs arise, which increase the price of the household appliance or of the industrial appliance disproportionately as compared with competitors' products.

b) In most instances of application, the user requires only the simple control elements described above, such as pushbuttons or rotary switches, which means that the user interfaces may even be found to be irritating to the user for the critical cases of maintenance or monitoring of the appliances. In the case of a video recorder or a remote control, for example, it is thus normal for rarely needed functions to be hidden in a complex fashion beneath additional panels or by rearranging the design of the appliances.

Particularly in the case of remotely controllable household appliances and industrial appliances, prior art requires that the control apparatus and the household appliance or industrial appliance to be controlled be specifically tuned to one another. In particular, it is necessary to ensure appropriate application control software on the control apparatus and the capability of communication between the control apparatus and the household appliance or the industrial appliance.

One frequently occurring problem in this regard is the compatibility between the external control apparatus, on the one hand, and the household appliance or industrial appliance, on the other.

The physical layer based on an inherently known communication layer model, particularly the OSI communication layer model (Open Systems Interconnection communication layer model), which is the basis for the wireless communication to take place between the control apparatus and the household appliance or industrial appliance, has standard communication protocols defined and in use for it, such as Bluetooth, IEEE802.11x, RKE, etc.

Within the communication layer model at the level of the application layer, i.e. an application which is to be controlled, the prior art normally presupposes that both appliances, i.e. the external control apparatus and the household appliance or industrial appliance, have specific, mutually tuned communication software and control software for the respective communication partner.

This presupposes that the external control apparatus, on the one hand, and the household appliance or industrial appliance, on the other, are tuned to one another in detail before they are started up.

This requires a high level of complexity and results in a low level of flexibility for the household appliance or industrial appliance. In order to be able to control an application associated with the household appliance or industrial appliance by using the external control apparatus, the prior art frequently requires the associated household appliance control program or industrial appliance control program to be stored in a memory device in the external control apparatus prior to initial startup, in order to be able to execute the household appliance control program or industrial appliance control program within the external control apparatus when the application is being executed as required and in order to able to transmit appropriate control signals to the household appliance or to the industrial appliance in order to control the application.

For this reason, there is a high memory requirement in the external control apparatus, and controlling a multiplicity of different applications as required may involve the external control apparatus reaching its capacity limits.

In addition, before a household appliance or industrial appliance is controlled for the first time, the associated application in the household appliance or in the industrial appliance and the external control apparatus, preferably a remote control, need to be tuned to one another in order to provide the requirements for later control of an application in the household appliance or in the industrial appliance. This is complex and difficult and frequently needs to be performed by an expert with technical training.

SUMMARY

The invention allows a household appliance or an industrial appliance to be remotely controlled using an external control apparatus with reduced complexity and therefore less expensively and more flexibly.

The present invention provides a controllable domestic appliance arrangement and/or controllable industrial appliance arrangement and by a control system for controlling a domestic appliance arrangement and/or an industrial appliance arrangement.

In one embodiment, the present invention provides a controllable domestic appliance arrangement and/or controllable industrial appliance arrangement has a domestic appliance and/or an industrial appliance which has or have at least one sensor for recording at least one sensor variable which represents a state of the domestic appliance and/or industrial appliance. In addition, there is a transmission/reception device which is coupled to the domestic appliance and/or to the industrial appliance, the transmission/reception device having a control unit, a first memory unit, which is coupled to the control unit, a control interface which is coupled to the control unit, and a communication interface which is coupled to the control unit. The first memory unit stores a domestic appliance control program and/or an industrial appliance control program. In addition, a second memory unit is provided in the domestic appliance and/or in the industrial appliance or in the transmission/reception device for storing the sensor variable recorded using the sensor. An external control apparatus can be used to control the domestic appliance and/or the industrial appliance via the control interface and via the communication interface by using the control unit. In addition, the communication interface can be used to transmit the domestic appliance control program and/or the industrial appliance control program and also the sensor variables stored in the second memory unit to the external control apparatus.

The transmission/reception device is mounted on or in the domestic appliance or industrial appliance.

One basic idea of the invention is to meet the requirements for using a central external control apparatus to control a domestic appliance or industrial appliance having different functions by virtue of the transmission/reception device itself also carrying the respective application control program, i.e. the domestic appliance control program or the industrial appliance control program, for controlling a domestic appliance or industrial appliance coupled to the transmission/reception device.

If, by way of example, a washing machine is the domestic appliance to be controlled from a laptop, then the transmission/reception device fitted in the washing machine contains the control software for controlling the washing machine. When the washing machine is to be controlled from the laptop, the control software is transmitted from the transmission/reception device to the laptop, so that a powerful processor in the laptop can execute the control software and can thus control the washing machine. In addition, the sensors or a sensor provided in the washing machine can be used to ascertain a wide variety of variables, for example a water filling level, a washing drum speed etc., and these can be transmitted to the laptop and thus taken into account when monitoring and controlling the washing machine using the external control apparatus.

The domestic appliance control program and the sensor variables ascertained can thus be transmitted to an external control apparatus via the communication interface. This external control apparatus, which contains a sufficiently powerful microprocessor, can execute the domestic appliance control program or the industrial appliance control program and can therefore control the application associated with the transmission/reception device. In this way, it is possible to dispense with complex prior configuration of the external control apparatus for a transmission/reception device for controlling a particular domestic appliance or an industrial appliance prior to the first use, which saves costs, time and storage space.

The invention provides a distributed system in which a transmission/reception device is able to communicate with an external control device which may possibly be unknown beforehand. In this case, no assumptions are made about the configuration of the physical communication layer, but the existence of a protocol conversion unit with IP (Internet Protocol) capability is preferred.

A domestic appliance is to be understood to mean both a household appliance, such as a refrigerator etc., and an entertainment appliance, such as a television, a video recorder or a stereo system.

An industrial appliance is preferably to be understood to mean an appliance fitted in a house, for example a heating system or one or more radiators or else a factory machine.

So that the domestic appliance or the industrial appliance can communicate with the external control apparatus, it is possible to set up a communication connection between the transmission/reception device and the external control apparatus using a communication protocol which is suitable for this purpose, for example based on the Common Object Request Broker Architecture (CORBA).

It is also possible to check (for example by transmitting an identification code) whether the domestic appliance control program or the industrial appliance control program is already contained in a memory device in the external control apparatus. If this is not the case, the domestic appliance control program or industrial appliance control program stored in the memory unit in the transmission/reception device is transmitted, i.e. downloaded, into a memory device in the external control apparatus via the communication interface. Preferably, this involves a computer program code for a middleware platform such as the Java Virtual Machine™ (JVM) or .NET, in order to be able to carry out smooth and platform-independent integration into the system of the external control apparatus, which can be controlled using a World Wide Web browser program, for example.

The communication between the domestic appliance control program or industrial appliance control program transmitted to the memory device in the external control apparatus and the control unit in the transmission/reception device can take place on an entirely application-specific basis, i.e. a communication standard does not need to be stipulated. The respective application software, i.e. the domestic appliance software or the industrial appliance software, is executed by a powerful processor in the external control apparatus, and the processor uses the control apparatus in the transmission/reception device to operate the domestic appliance or the industrial appliance which is associated with the transmission/reception device.

In other words, the transmission/reception device itself also carries the domestic appliance control program or the industrial appliance control program which the external control apparatus needs in order to control the domestic appliance or the industrial appliance. The transmission/reception device carries the software program code for the application which is to be executed, but is not the executing body itself. Hence, the control unit in the transmission/reception device may be in the form of a simple 8-bit microprocessor, for example, and does not need to be an expensive high-performance processor. The domestic appliance control program or the industrial appliance control program is executed by the external control apparatus, which can communicate with the transmission/reception device such that the computer program code required for this can be transmitted to the external control apparatus.

A domestic appliance is preferably a household appliance, for example a refrigerator, a dishwasher, a washing machine, a tumble dryer, a microwave oven or a stove, or alternatively an entertainment appliance, such as a stereo system or a video recorder or a remotely controllable television.

In line with one embodiment of the invention, an industrial appliance is a heating system or a radiator or else a factory machine.

In line with another embodiment of the invention, the sensor is set up as a temperature sensor, as a filling level sensor, as a humidity sensor, as a gas sensor and/or as a pressure sensor.

It should be noted in this connection that, depending on the application for the domestic appliance or the industrial appliance, a plurality or multiplicity of different or homogeneous sensors may be provided, so that different data can be recorded during operation of the domestic appliance or industrial appliance, can be transferred to the external control apparatus and can be considered there as part of the control.

According to one embodiment of an invention, the transmission/reception device is set up as an embedded device which is provided on or in the domestic appliance or on or in the industrial appliance and is coupled thereto.

Preferably, the communication interface on the transmission/reception device is set up such that the communication with an external control apparatus takes place via a radio link.

The invention provides for wireless communication between the transmission/reception device and the external control apparatus, which increases user convenience. The communication can take place using infrared radiation, radio radiation or electromagnetic radiation of another suitable wavelength, for example. Alternatively, the communication may also take place using an electrical coupling means (for example a power line). By way of example, in this connection the communication interface is set up to communicate on the basis of a radio communication standard, for example on the basis of Bluetooth, on the basis of IEEE 802.11x, on the basis of RKE etc.

The memory unit in the transmission/reception device may be writable (read/write memory) or may be nonwritable (read only memory). Preferably, the first memory unit in the transmission/reception device is writable via the communication interface. Alternatively, the first memory unit may be a memory having a first and a second submemory, the first submemory being writable and the second memory being nonwritable.

In particular, the first memory unit or the first submemory is a read/write memory, i.e. a RAM (Random Access Memory), or a nonvolatile read/write memory (for example an EPROM, an EEPROM or a Flash memory).

If the memory unit or the second submemory is set up as a nonwritable memory, then the memory unit or the second submemory may be a read only memory, i.e. an ROM.

It is desirable for the memory for storing the domestic appliance control program or the industrial appliance control program, in general terms the control application, to be produced as small or as cost efficiently as possible. For this reason, the memory unit in the transmission/reception device preferably has a storage capacity of less than 1 megabyte.

The memory unit in the transmission/reception device may have a first and a second submemory, the first submemory storing a domestic appliance control program or industrial appliance control program which is specific to the control of a quite particular domestic appliance or industrial appliance, and the second submemory storing other data. The other data may be information regarding a menu structure for operating or controlling the domestic appliance or the industrial appliance or information regarding a graphical user interface.

The memory unit may have a first submemory or a second submemory, the first submemory storing specific data for a member of an application family, and the second submemory storing data which are common to an application family.

With reference to the external control apparatus, which is also called a "mobile terminal", a domestic appliance control program or an industrial appliance control program is downloaded onto a middleware platform, in which the domestic appliance control program or the industrial appliance control program can be executed on the external control apparatus. The transmission/reception device may optionally contain this application in the form of one cohesive block in a homogeneous memory unit, but the application may alternatively be split into (at least) two subblocks. Despite a frequently large number and diversity of applications which are to be controlled by a central external control apparatus, a plurality of application families can frequently be distinguished on the basis of the domestic appliances or industrial appliances into which a transmission/reception device of the invention may be embedded. An application family includes, by way of example, transmission/reception devices with a common input/output configuration, e.g. A/D converters or D/A converters, digital inputs or digital outputs, standard industrial interfaces etc. In this case, the individual members of an application family differ in manufacturer-specific and type-specific details, for example. The domestic appliance control programs or the industrial appliance control programs of the members of an application family often have a large congruent software component. This common component may be implemented, by way of example, in the form of a computer program stored in the ROM, which means that a significant cost advantage is achieved particularly when the domestic appliance or the industrial appliance is in large numbers.

A RAM (particularly a Flash memory) in the memory unit in the transmission/reception device may contain that component of a domestic appliance control program or industrial appliance control program with regard to which the different members of an application family (for example different types of washing machines, dishwashers, etc.) differ from one another. This may involve configuration data (for example text from screen menus) or independent software components, for example.

It should be noted that the ROM component or the RAM component of the memory unit in the transmission/reception device is normally a separate component from the main memory in the transmission/reception device, said component serving merely as carrier for the program code of the domestic appliance control program or industrial appliance control program. The stored program code can be read by the transmission/reception device from its memory unit without interpretation and can be transferred to a memory device in an external control apparatus. The receiver end does not need to be able to distinguish which program code components come from a RAM or from a ROM.

In summary, it can be stated that a domestic appliance control program or industrial appliance control program can be split into a ROM component and a RAM component, the ROM component being able to be used for different applications and being able to be produced particularly inexpensively. The RAM component contains, by way of example, specific configurations or specific program code constituents which are specific to the respective domestic appliance or the respective industrial appliance. This memory split achieves a further cost saving.

The control unit in the transmission/reception device may be a microprocessor, particularly an 8-bit microprocessor or a 16-bit microprocessor. For the microprocessor in the transmission/reception device, a comparatively limited power (in relation to the power of the external control apparatus) is sufficient, since the microprocessor does not need to be capable of independently executing the domestic appliance control program or industrial appliance control program in order to control the associated domestic appliance or industrial appliance. This functionality is taken on by the more powerful processor in the external control apparatus. Equipping the transmission/reception device with a comparatively simple microprocessor results in a further cost advantage.

In addition, the inventive transmission/reception device may have an initialization unit which is set up such that the initialization unit can be used to set up a communication connection to the external control apparatus. In particular, the initialization unit may be set up such that it can set up a communication connection to the external control apparatus by transmitting a signal to the control apparatus. Additionally or optionally, the initialization unit may be set up such that it can set up a communication connection to the external control apparatus by accepting a signal from an external control apparatus.

The inventive transmission/reception device is particularly well suited to controlling such domestic appliances or industrial appliances as are battery operated, i.e. are not coupled to the electricity mains by means of a socket, for example. The power supply for the domestic appliance or industrial appliance may also be provided by a solar cell or by a thermogenerator, for example. From this aspect, it is desirable for the domestic appliance or industrial appliance associated with a transmission/reception device to be in a particularly power-saving form. In one scenario, in which the transmission/reception device receives and hence accepts external signals from the external control apparatus for the purpose of setting up a communication connection and emits only a few such signals itself, a transmission/reception device with a low power requirement is obtained. If, by way of example, an external control apparatus is provided for controlling the household appliances in a dwelling house, then the external control apparatus can emit communication signals in a prescribed time sequence (for example every second, every minute or every hour), said communication signals being able to be received by a transmission/reception device in an associated domestic appliance or industrial appliance, for example when a user with an external control apparatus enters a room. When corresponding communication signals have been received from the external control apparatus by the transmission/reception device, the transmission/reception device can return an acknowledgement signal to the external control apparatus.

The communication protocol used for communication between the initialization unit and an external control apparatus may be one of the following communication protocols, for example:

a communication protocol based on the Common Object Request Broker Architecture (CORBA), Simple Service Discovery Protocol (SSDP), Universal Plug and Play (UPnP), JXTA or Java Intelligent Network Infrastructure (JINI).

In particular, a standard protocol is preferably used for the communication by the initialization unit. Since only a single service can normally be provided, namely the service of transmitting the domestic appliance control program or industrial appliance control program, it is also possible to use a simple version of such a discovery protocol or a proprietary protocol.

The domestic appliance control program or the industrial appliance control program may be in the form of a Java computer program code, for example.

Preferably, the transmission/reception device is set up as an "embedded system". An embedded system is to be understood to mean a form of process computer system which is much smaller and has less processing power than a server computer, said process computer system having the following properties, in particular:

an embedded system is normally part of another appliance (frequently fitted therein) whose function is essentially defined by the embedded system. In particular, an embedded system may be a measured-value preprocessing system integrated into another appliance.

As compared with larger process computer systems, a device for man/machine communication in an embedded system is not or is only poorly distinctive.

There is often a keyboard or a display which can be used to operate not the embedded system but rather the application appliance, i.e. the household appliance or the industrial appliance.

A counterpart for an embedded system would be a computer server computer, for example.

The external control apparatus may be a personal computer, a laptop, a sufficiently powerful radio mobile telephone, a Personal Digital Assistant (PDA), for example a Palm™ Pilot.

The external control apparatus in the inventive control system may have a memory device for storing at least one domestic appliance control program and/or industrial appliance control program and also a processor which is set up such that it can execute a domestic appliance control program and/or industrial appliance control program in order thereby to control a domestic appliance or industrial appliance coupled to the transmission/reception device.

The external control apparatus may have a storage-period management device which is set up such that for each domestic appliance control program and/or industrial appliance control program stored in the memory device it prescribes a time value which indicates the time after which the domestic appliance control program and/or the industrial appliance control program is/are erased from the memory device. The time value may be prescribed by the storage-period management device on the basis of at least one of the following criteria:

How often has/have the domestic appliance control program and/or the industrial appliance control program been executed in the past?

When was/were the domestic appliance control program and/or the industrial appliance control program last executed?

What memory requirement has/have the domestic appliance control program and/or the industrial appliance control program?

What type of application is/are the domestic appliance control program and/or the industrial appliance control program concerned with?

By way of example, the storage-period management device may prescribe a small time value, representing a comparatively short period, for a domestic appliance control program and/or industrial appliance control program which has been executed very rarely in the past and which has a very high memory requirement. When a time corresponding to the prescribed time value has elapsed, this domestic appliance control program or industrial appliance control program can be erased from the memory device.

The storage-period management device manages the memory device in the external control device. If a domestic appliance control program and/or an industrial appliance control program has/have a high memory requirement, for example, and if this domestic appliance control program and/or industrial appliance control program which has/have been transmitted by a transmission/reception device in the external control apparatus at a time in the past has/have been used only rarely or only at long intervals of time, then the domestic appliance control program and/or industrial appliance control program is/are erased after the period corresponding to the associated time value has elapsed. Further criteria are provided alternatively or in addition, on the basis of which the storage-period management device prescribes a time value for a domestic appliance control program and/or industrial appliance control program.

The external control apparatus may also contain an interrogation unit which is set up such that it can be used to ascertain whether the memory device already contains a domestic appliance control program and/or industrial appliance control program which is/are stored in the memory unit. If the interrogation unit has been used to ascertain that the memory device already contains a domestic appliance control program and/or industrial appliance control program which is/are stored in the memory unit, the domestic appliance control program and/or the industrial appliance control program is/are not transmitted to the external control apparatus. Otherwise, the domestic appliance control program or industrial appliance control program is transmitted to the external control apparatus.

In a transmission/reception device based on another exemplary embodiment of the invention, an identification statement uniquely identifying the application control program is stored in the memory unit instead of the domestic appliance control program and/or the industrial appliance control program. This identification statement may be an Internet address from which the external control apparatus is able to download the domestic appliance control program or the industrial appliance control program from the Internet. In other words, in line with this configuration, a domestic appliance control program or an industrial appliance control program is downloaded from an HTML (Hypertext Markup Language) page from the Internet. In this scenario, it is merely necessary for the transmission/reception device in the external control apparatus to transmit that address of an HTML page from which the application control program can be downloaded. The domestic appliance control program or the industrial appliance control program can then be downloaded from the Internet by the external control apparatus, so that it is possible to dispense with transmitting the entire computer program code from the transmission/reception device to the external control apparatus.

The external control apparatus may be controlled using a World Wide Web browser program.

The invention can clearly be seen as being that, instead of dispensing with a user interface for maintenance and control of a household appliance or an industrial appliance, or of fitting one into every household appliance or industrial appliance in costly fashion, as in the prior art, the interfaces are exported to an appliance which is suitable for this purpose. Such an appliance is preferably an external control apparatus, such as a Personal Digital Assistant, a laptop, an intelligent mobile radio appliance or permanently installed home PCs.

BRIEF DESCRIPTION OF THE DRAWINGS

The invention is now explained in more detail on the basis of exemplary embodiments with reference to the accompanying figures.

DETAILED DESCRIPTION

Figure 1:
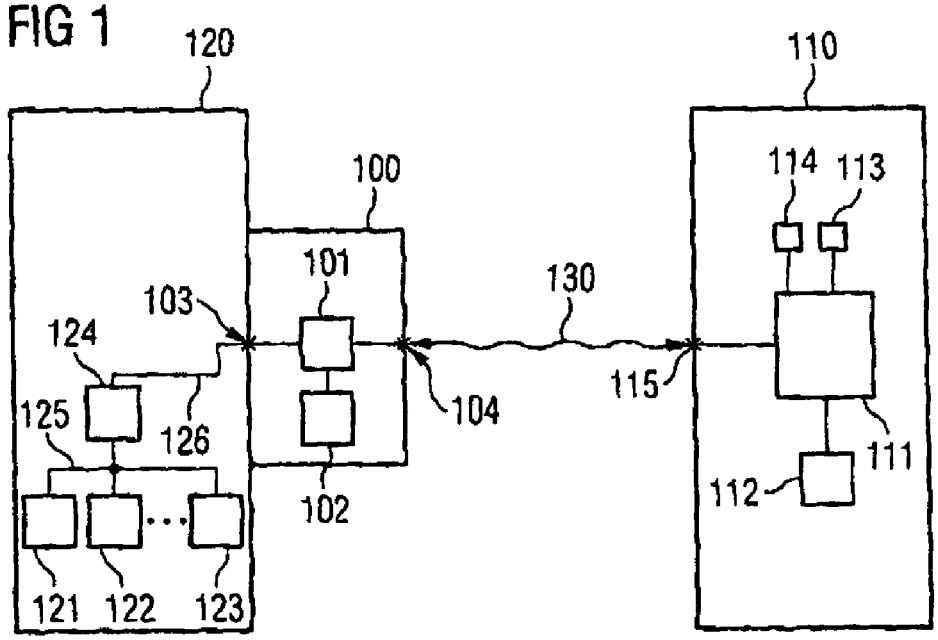
FIG. 1 illustrates a schematic view of a washing machine arrangement with an external control apparatus and a washing machine according to a first exemplary embodiment of the invention.

FIG. 1 illustrates a controllable washing machine arrangement with a transmission/reception device 100 and a washing machine 120 according to a first exemplary embodiment of the invention.

The transmission/reception device 100 (transceiver) has an 8-bit microprocessor 101 as control unit. In addition, the transmission/reception device 100 has a memory unit 102 with a storage capacity of 128 kB, which memory unit is coupled to the 8-bit microprocessor 101. In addition, the transmission/reception device 100 has a communication interface 104 which is coupled to the 8-bit microprocessor 101. The memory unit 102 stores a washing machine control program (not shown) for controlling the washing machine 120 as a domestic appliance control program. A laptop 110 as an external control apparatus can be used to control the washing machine 120 via the control interface 103 on the washing machine 120 and via the communication interface 104 on the transmission/reception device 100 using the 8-bit microprocessor 101. The communication interface 104 can be used to transmit the washing machine control program for controlling the washing machine 120 to the laptop 110. An arrow 130 symbolizes that the communication interface 104 is set up such that the communication between the transmission/reception device 100 and the laptop 110 takes place by means of reciprocal transmission of infrared radiation, i.e. via a radio link. The washing machine control program stored in the memory unit 102 in the transmission/reception device 100 is in the form of Java computer program code.

The transmission/reception device 100 is set up as an embedded system and is fitted in the washing machine 120.

The laptop 110 has a central data processing unit CPU 111, which is much more powerful than the 8-bit microprocessor 101 in the transmission/reception device 100. In particular, the power of the CPU 111 is sufficient to execute the washing machine control program for controlling the washing machine 120 in a sufficiently short time. The laptop 110 also has a hard disk memory 112 with a capacity of 5 GB as a memory device. The CPU 111 is set up such that it can execute a washing machine control program in order to control the washing machine 120 coupled to the transmission/reception device 100. The laptop 110 also has a storage-period management device 113 which is set up such that for each washing machine control program stored in the hard disk memory 112 it prescribes a time value which indicates the time after which the respective washing machine control program is erased form the hard disk memory 112.

The text below describes the manner of operation of the system illustrated in FIG. 1.

When a user with the laptop 110 enters the room in which the washing machine 120 is located, a communication connection is automatically set up between the transmission/reception device 100 and the laptop 110 by virtue of an initialization unit in the transmission/reception device 100 accepting a signal from the laptop 110 (not shown in FIG. 1).

An interrogation unit 114 in the laptop 110 is set up such that it can be used to ascertain whether the hard disk memory 112 already contains the application control program for controlling the washing machine 120 which is stored in the memory unit 102 in the transmission/reception device 100. In line with the present scenario in the exemplary embodiment described, the hard disk memory 112 does not store such an application control program.

Using an identification statement for the washing machine 120 which was transmitted from the washing machine 120 to the laptop 110 at the start of set up of the communication connection, and which indicates the type of washing machine and the type of washing machine control program stored in the transmission/reception device 100, the interrogation unit 114 is used to transmit the appropriate washing machine control program to the washing machine 120.

In this way, the interrogation unit 114 has been used to ascertain that the hard disk memory 112 has not yet stored the washing machine control program for controlling the washing machine 120. Since the washing machine control program required for controlling the washing machine 120 is not stored in the hard disk memory 112 in the laptop 110 in order to control the washing machine 120, the communication interface 104 is used to transmit the washing machine control program stored in the memory unit 102 in the transmission/reception device 100 to the laptop 110 via a laptop communication interface 115, and said washing machine control program is stored in the hard disk memory 112.

The storage-period management device 113 is used to assign the washing machine control program stored in the hard disk memory 112 a time value (on the basis of the memory requirement of the washing machine control program and on the basis of the type of application) after whose expiry the washing machine control program is erased from the hard disk memory 112. According to the first exemplary embodiment of the invention, the washing machine control program for controlling the washing machine 120 is assigned the time value "6 months".

When the washing machine control program has been stored in the hard disk memory 112 in the laptop 110, the CPU 111 in the laptop 110 is used to execute the washing machine control program. In this way, the laptop communication interface 115 is used to control the communication interface 104 on the transmission/reception device 100, and the control interface 103 on the washing machine 120 is used to control the washing machine 120 with the aid of the 8-bit microprocessor 101.

After the prescribed time value ("6 months") has elapsed, the washing machine control program is erased from the hard disk memory 112 in the laptop 110 if the washing machine control program has not been used at least one further time within this period. With every operation of using the washing machine control program, the time value starts to run from fresh in according to the first exemplary embodiment of the invention.

The washing machine 120 also has a plurality of n different sensors 121, 122, 123 and also a memory 124. The sensors 121, 122, 123 are coupled to the memory 124 by means of electrical lines 125. In addition, the memory 124 is coupled by means of a further electrical line 126 to the control interface 103 and, via the latter, to the transmission/reception device 100 and to the communication interface 104 on the transmission/reception device 100. Sensor variables or sensor values recorded by the sensors 121 are stored in the memory 124 and are read therefrom as required and are transferred to the laptop 110 using the control interface and the communication interface 104.

In line with this exemplary embodiment of the invention, the sensors 121, 122, 123 are set up such that particularly information about the following aspects of the washing machine 120 is recorded:
information about the supply of water,
information about the state of the waste water pump in the washing machine 120,
information about the spin cycle, for example about the speed of the washing machine drum,
information about the state of the lint filter in the washing machine 120,
information about the calcification state of the heating rods in the washing machine 120,
information about a remaining rinse time for a wash cycle which is being carried out in the washing machine 120.

These data dynamically captured in the washing machine 120 can be used for monitoring and even remote maintenance using the laptop 110, in addition to for control of the washing machine 120.

The inventive washing machine 120 thus permits:
querying of the fault status (regarding the supply of water, the waste water pump, a spin cycle etc.);
querying of the lint filter state, the calcification state of the heating rods, a remaining rinse time (in the form of a remote query);
remote configuration of the washing machine in terms of wash duration, a wash program which is to be used, a spin program which is to be used, wash times which are to be used, etc.

Figure 2:
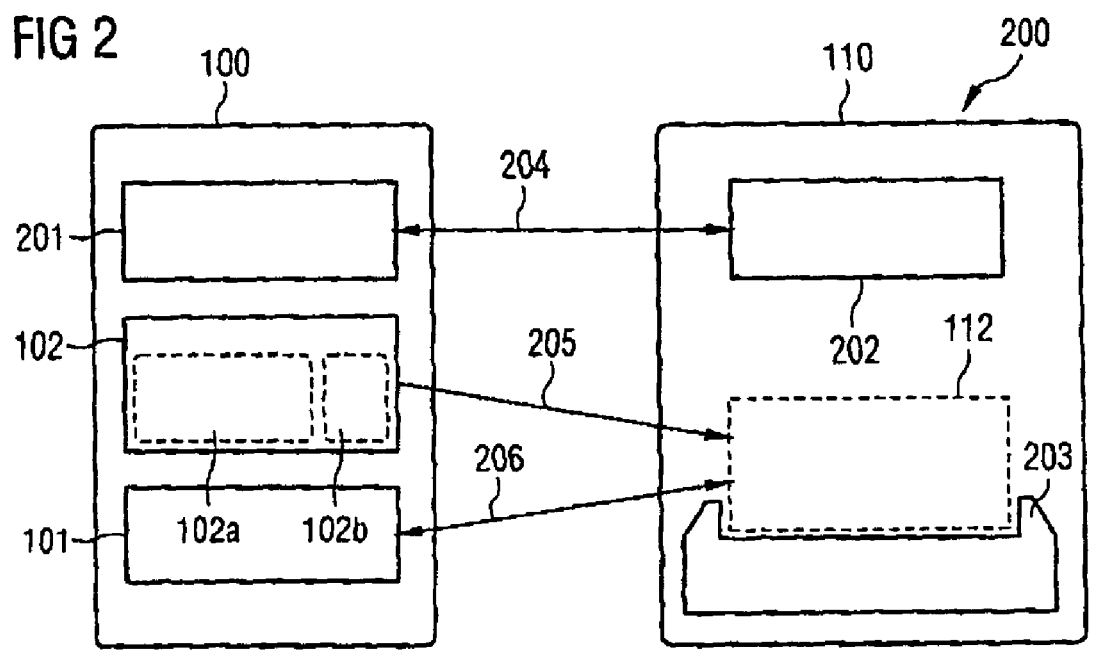
FIG. 2 illustrates a control system according to the first exemplary embodiment of the invention.

The text below describes a control system 200 for controlling the washing machine 120 with reference to FIG. 2. The control system 200 has the transmission/reception device 100 and the laptop 110, which is set up such that it can communicate with the transmission/reception device 100, as described above.

The transmission/reception device 100 has the control unit 101, set up as an 8-bit microprocessor, or alternatively as a 16-bit microprocessor. The transmission/reception device 100 also has the memory unit 102 and an initialization device 201. The memory unit 102 is split into a ROM submemory 102a and a Flash submemory (RAM) 102b. The memory unit 102 stores a washing machine control program for controlling the washing machine 120. The ROM submemory 102a stores data which are common to an application family in the washing machine 120, whereas the Flash submemory 102b stores specific data for one member of an application family, i.e. specific data about the washing machine 120. According to the first exemplary embodiment, the application family represents different washing machine types from a particular manufacturer. Those data or that control computer program code which is/are required in order to control all of the washing machines from the respective manufacturer is/are stored in the ROM submemory 102a. That control computer program code in the washing machine control program for controlling the washing machine 120 of type XY which differs from the control computer program code for controlling other washing machine types (type XZ, type YZ etc.) from the respective manufacturer is stored in the Flash submemory 102b.

In addition, the laptop 110 is shown in more detail. The laptop 110 has a communication module 202, the hard disk memory 112 and a middleware platform 203 (set up as a Java Virtual Machine). In this exemplary embodiment of the invention, middleware is to be understood to mean a piece of interpreter software which is used to provide interaction between hardware components and software components, regardless of the actual hardware, in other words independently of platform.

The text below describes the communication between the transmission/reception device 100 and the laptop 110.

First, the communication between the transmission/reception device 100 and the laptop 110 is initialized, i.e. a communication connection is set up. The communication protocol used for the communication between the initialization unit 201 and the communication module 202 in the laptop 110 is, by way of example, the Java Intelligent Network Infrastructure (JINI) communication protocol or the Simple Service Discovery Protocol (SSDP). The phase in which the transmission/reception device 100 and the laptop 110 make contact with one another can also be called the "Discovery Phase". The initial communication is symbolized by an arrow 204.

If the hard disk memory 112 does not yet contain the washing machine control software in the memory unit 102, the washing machine control software is transferred from the transmission/reception device 100 to the laptop 110, where it is stored in the hard disk memory 112. The decision about whether the washing machine control program needs to be transmitted from the transmission/reception device 100 to the laptop 110 is taken on the basis of an identification number which is transmitted from the transmission/reception device 100 to the laptop 110. The identification number is taken as a basis for checking whether or not the washing machine control program associated with the identification number is already stored on the hard disk 112. If required, the result of the check is taken as a basis for transmitting the washing machine control program from the memory unit 102 in the transmission/reception device 100 to the hard disk memory 112 in the laptop 110. This is symbolized in FIG. 2 by a second arrow 205.

When the washing machine control program has been downloaded from the memory unit 102 to the hard disk memory 112, the washing machine 120 is controlled via the control unit 101 using the middleware platform 203 or using the washing machine control program stored in the hard disk memory 112. This application-specific control communication is symbolized in FIG. 2 by a third arrow 206.

In addition, the laptop 110 is used to monitor the sensor variables of interest which have been recorded, which are stored in the memory 124 in the washing machine 120 and are transferred to the laptop 110, likewise using the communication interface 104, and are stored in the hard disk memory 112.

After a fault which may have occurred or an impending fault in the washing machine 120 which has been ascertained on the basis of the recorded sensor variables which are available in the laptop 110, the invention takes an appropriate measure to rectify the fault or to avoid an impending fault.

Thus, by way of example, unscheduled maintenance work can be carried out on the washing machine 120 by maintenance staff, or an early warning can be output to the user of the laptop 110 and of the washing machine 120, so that he can turn off the washing machine 120 if appropriate or can control it in another way as desired, so that the fault or the impending fault is countered as appropriate.

The text below describes the transmission/reception device 100 according to the first exemplary embodiment of the invention in detail with reference to FIG. 3.

As explained above, the transmission/reception device 100 has a control unit 101 in the form of an 8-bit microprocessor, an input/output unit 301, a first submemory 102a in the form of a Flash memory and also the second submemory 102b in the form of a ROM, an RF (Radio Frequency) transmission/reception unit 302 and also an embedded microcontroller 303.

Figure 3:
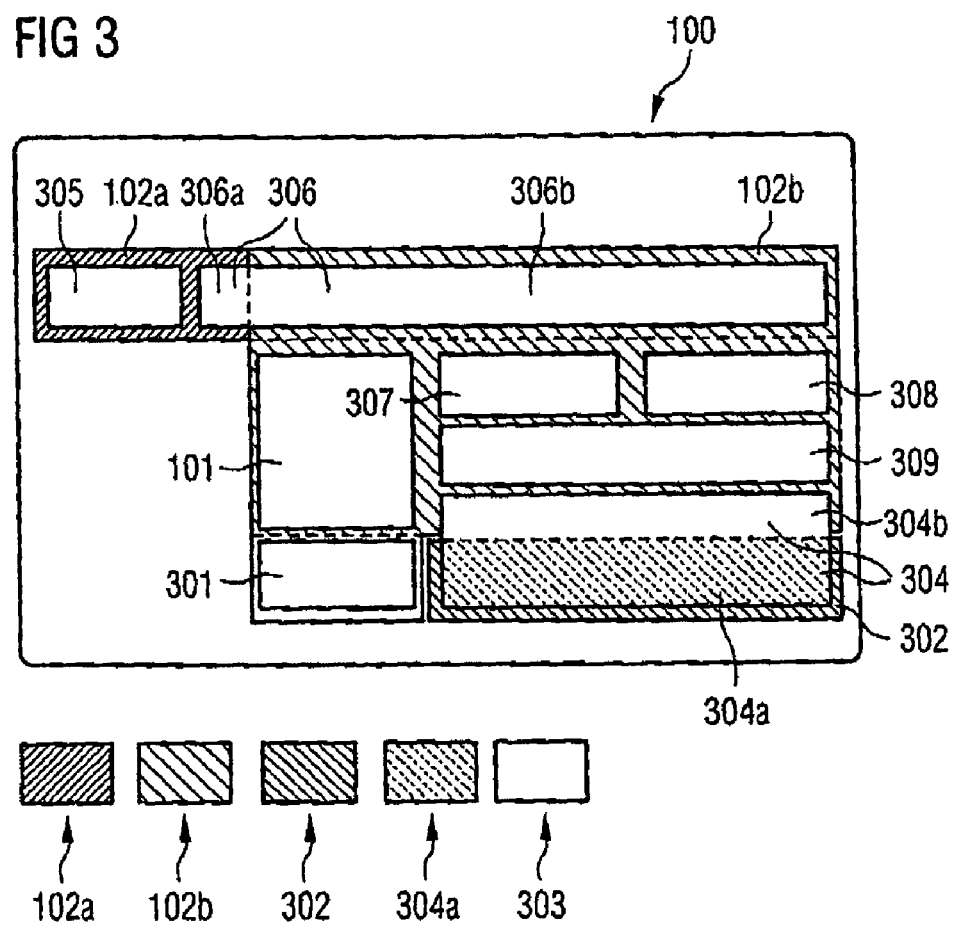
FIG. 3 illustrates a transmission/reception device according to the first exemplary embodiment of the invention.

In addition, FIG. 3 schematically illustrates a physical communication unit 304 which has a first subregion 304a, which is part of the RF transmission/reception unit 302, and which has a second subregion 304b, which is ascribed to the microcontroller 303. The configuration data 305 are also part of the microcontroller 303. In addition, FIG. 3 schematically shows a washing machine control program 306, which is likewise associated with the microcontroller 303. An initialization protocol 307 is also contained in the transmission/reception device 100, and is likewise part of the microcontroller 303. In addition, a transmission protocol 308 is provided in the transmission/reception device 100, and is likewise part of the microcontroller 303. A TCP-IP protocol stack 309 (Transport Control Protocol—Internet Protocol protocol stack 309) is also provided as an additional part of the microcontroller 303.

As illustrated schematically in FIG. 3, the configuration data 305 are stored in the Flash memory 102a. The Flash memory 102a likewise stores a first subregion 306a of the washing machine control program 306.

The first subregion 306a contains data which are specifically tuned to the washing machine 120 which is to be controlled. In other words, these data are not common data for the application family to which the washing machine 120 which is to be controlled belongs. Rather, these data are such data as are specifically intended for the washing machine 120 as a member of an application family, and as differ from the control data for other members of the application family. By contrast, the second subregion 306b of the washing machine control program 306 is stored in the ROM 102b and contains such data as are required by the application family with which the washing machine 120 is associated as a family member. The TCP-IP protocol stack 309 is likewise in the form of a computer program and is stored in the ROM 102b. The initialization protocol 307 contains data which are required in order to set up a communication connection to the laptop 110. The transmission protocol 308 contains data which are required if configuration data 305 or the washing machine control program 306 is/are to be transmitted from the transmission/reception device 100 to the external laptop 110.

The washing machine control program 306 or the configuration data 305 is/are executed by a CPU 111 in the external laptop 110. The control unit 101 is used to monitor and control a washing machine which is connected to the transmission/reception device 100. The monitoring and control are performed using the input/output unit 301. The input/output unit 301 thus represents an interface between the control unit 101 and the washing machine 120 which is to be controlled. The input/output unit 301 is used to perform the data transfer from the transmission/reception device 100 to the washing machine 120.

According to the first exemplary embodiment of the invention, the middleware platform 203 in the laptop 101 is a Java Virtual Machine™. According to this exemplary embodiment of the invention, the application code to be transmitted from the transmission/reception device 100 to the laptop 110 is a Java Apple™ (execution of code within an Internet browser) or a Java application™ (execution of program code using a starter application in the laptop 110) or a Java plugin (execution of code within a running application). A Java application is an independent Java computer program which can be executed using a Java interpreter. A Java applet is a Java computer program which can be loaded into a running World Wide Web browser program. A Java plugin is a Java computer program which can be executed within a running application and makes use of the resources of the application or provides services for the application.

The washing machine control program may be made up of Java class files and resource files (for example image files, audio files, etc.) which, according to this exemplary embodiment of the invention, are combined in one or more Jar archive files. In this case, not only is concentration possible, but also classes and resources can be stored in Jar archives in compressed form. This means that not only is the communication of the computer program code minimized, but also the storage complexity in the transmission/reception device 100.

Figure 4:
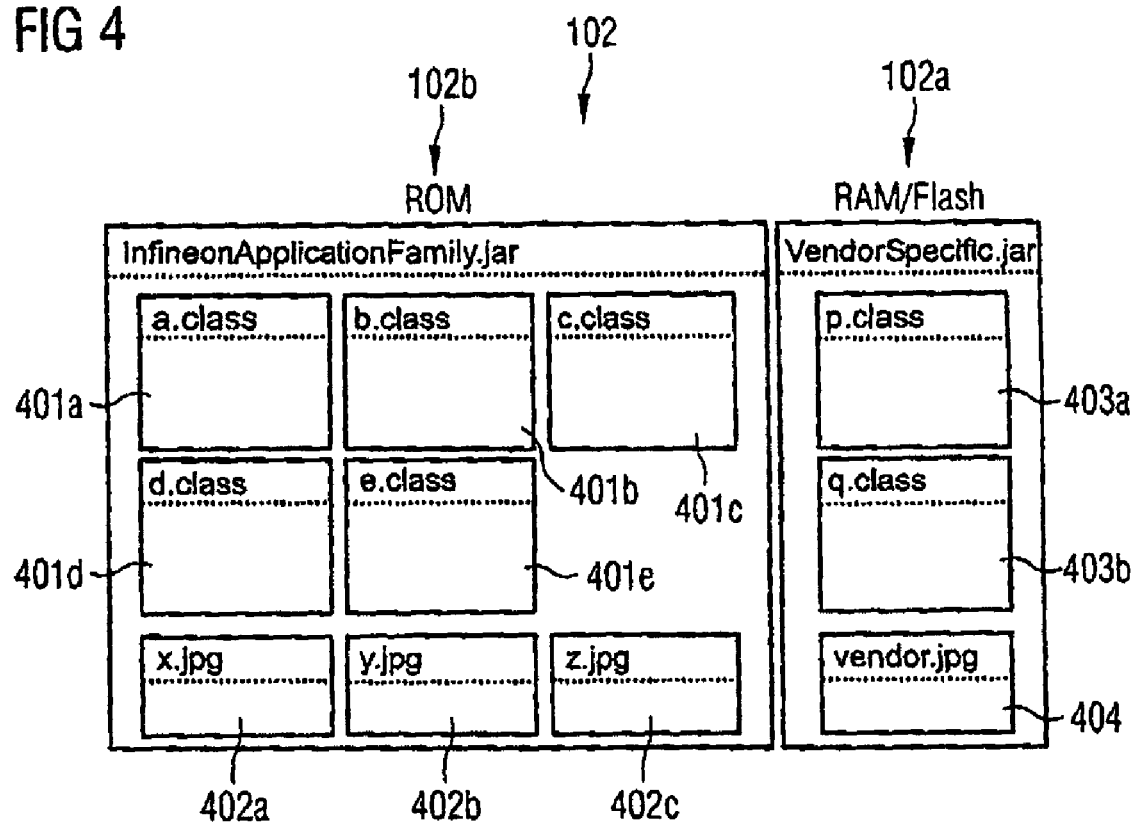
FIG. 4 illustrates a memory unit in a transmission/reception device according to the first exemplary embodiment of the invention.

The text below describes the split for the storage-bound information in the memory unit 102 in the transmission/reception device 100 with reference to FIG. 4.

The memory unit 102 is split into the ROM submemory 102b and the RAM Flash memory 102a. The washing machine control program 306 for controlling the washing machine 120 is divided into two Jar archives, namely into "InfineonApplicatiorFamnilyjar" and "VendorSpecific.jar".

The "InfineonApplicationFamily.jar" archive combines first to fifth superclasses 401a–401e and first to third resource files 402a–402c for an application family. In the first exemplary embodiment described, the resource files 402a–402c are each graphics files in JPG format.

The "VendorSpecific.jar" archive contains a first subclass 403a and a second subclass 403b and also a resource file 404, again in the form of a JPG graphics file.

The use of classes in the RAM Flash memory 102a is not absolutely essential. The resource file 404 contains manufacturer-specific resources, for example a company logo or text files, e.g. for a specific menu structure.

Figure 5:
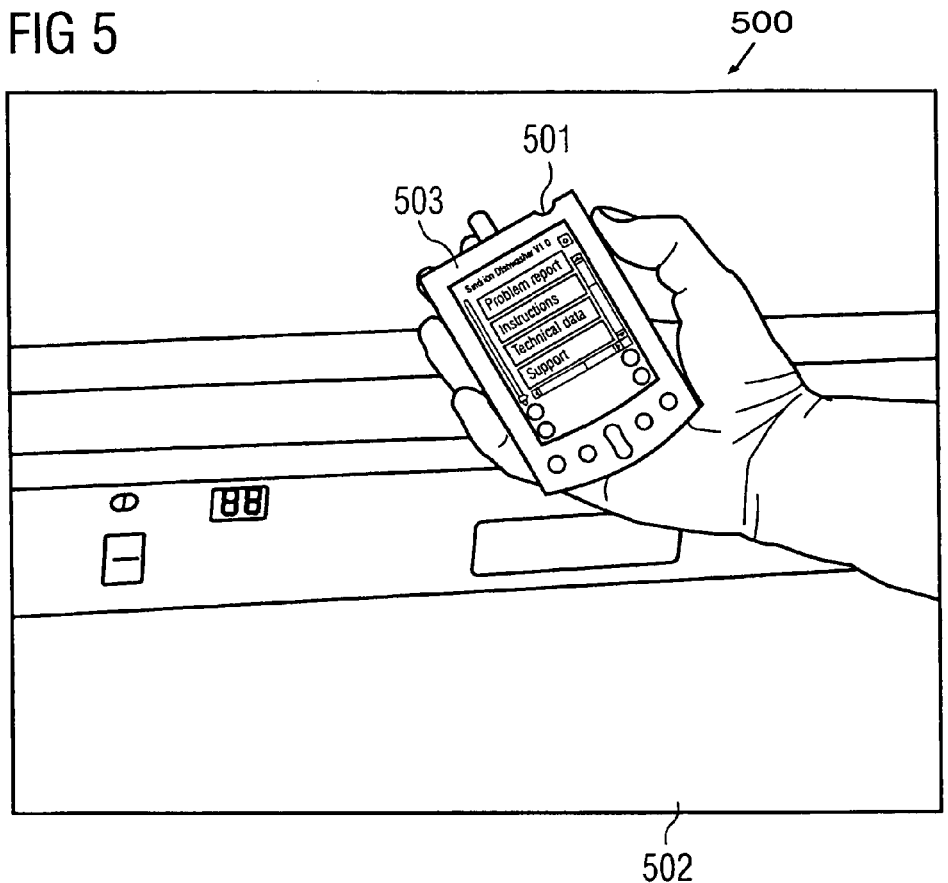
FIG. 5 illustrates a dishwasher arrangement with an external control apparatus and a dishwasher according to a second exemplary embodiment of the invention.

FIG. 5 illustrates a dishwasher arrangement 500 as a second exemplary embodiment of the invention, in which a Personal Digital Assistant 501 is provided for controlling a dishwasher 502.

The basic design of the dishwasher 502 corresponds, in terms of the transmission/reception device, to that of the washing machine 120 according to the first exemplary embodiment of the invention.

However, the dishwasher 502 differs in the type of sensors which are provided in the dishwasher.

According to the second embodiment, the sensors are set up to
- record the supply of water, the status of the waste water pump etc.,
- record the salt content, the rinser content, the calcification state of the heating rods in the dishwasher, a remaining rinse time for a dishwasher which is in operation (remote querying).

In addition, the dishwasher is set up to configure the degree of hardness for protection of the environment (temperature, rinse time) according to the individual need of the user, and also to program the rinse time for a dishwasher cycle.

It is thus possible, in line with this exemplary embodiment, to create fault status queries for the dishwasher regarding the supply of water, the waste water pump etc. and to query the salt content, the rinser content, the calcification state of the heating rods and also the remaining rinse time for the dishwasher 502.

The dishwasher control program transferred from the transmission/reception device in the dishwasher 502 to the PDA 501 contains information for creating a graphical user interface 503. The graphical user interface is transferred from the transmission/reception device to the PDA 501 via the radio link 601 (cf. FIG. 6) and is displayed to the user there on the display unit of the PDA 501.

Figure 6:
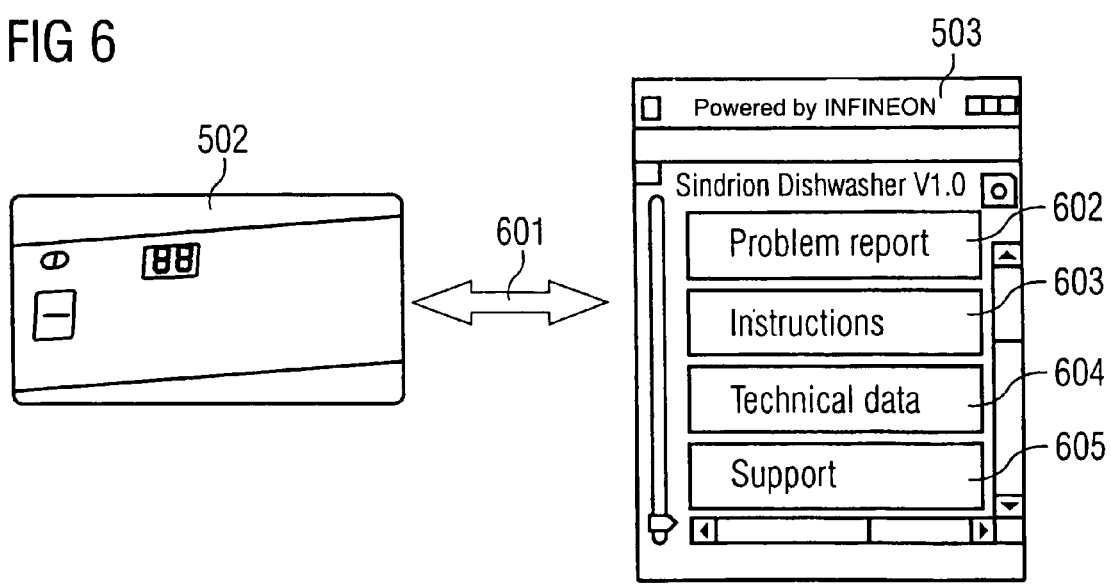
FIG. 6 illustrates a sketch to illustrate the communication between a user application with a graphical user interface and the external control apparatus.

As FIG. 6 illustrates, the graphical user interface 503 allows the user, by way of example,
- to select a first menu key 602 in order to create a fault report,
- to select a second menu key 603 in order to create instructions for the dishwasher and to transmit these instructions to the dishwasher,
- to select a third menu key 604 in order to receive a display of more detailed technical data for the dishwasher, and
- to select a fourth menu key 605 in order to request technical support, for example by contacting an appropriate service provide, for example by automatically dialing up a server computer belonging to the service provider, whereupon a technical expert is asked to come to the house to repair the dishwasher 502. In this case, the respective request for technical support may also contain appropriate problem information or fault information.

The communication connection 601 between the dishwasher 502 and the PDA 501 is transparent to the user.

As FIG. 6 illustrates, the inventive user interface is much more convenient than the user interface on the dishwasher 502 itself.

Figure 7:
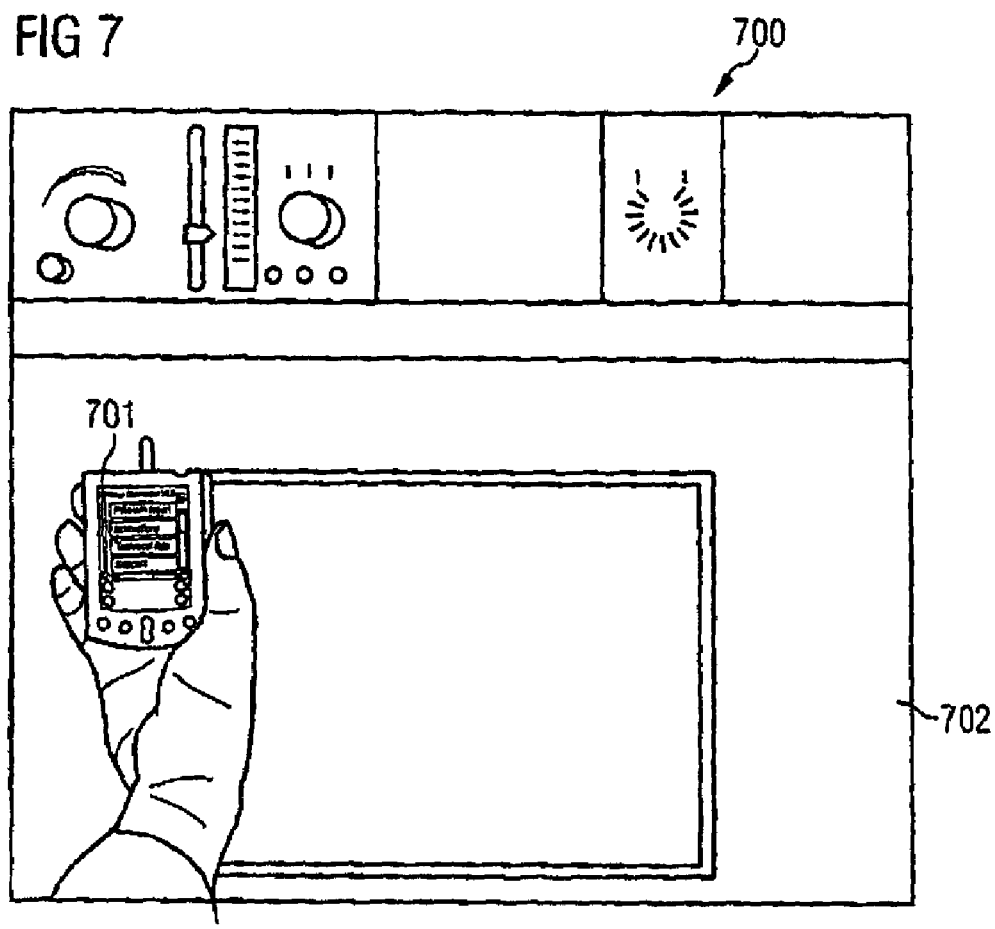
FIG. 7 illustrates a controllable microwave oven arrangement with an external control apparatus and a microwave oven according to a third exemplary embodiment of the invention.

FIG. 7 illustrates a microwave oven arrangement 700 with a PDA 701 as control apparatus and with a microwave oven 702.

The basic structure corresponds to the structure illustrated in connection with the first exemplary embodiment, but particularly the sensors and the controlled variables differ specifically on the basis of the appliance properties of the microwave oven 702 as compared with the appliance properties of the washing machine 120 according to the first exemplary embodiment of the invention.

The sensors in the microwave oven 702 are set up to record information about the radiating antenna, about the turntable, about the light for operating the microwave oven, and about the latter's heating rods. In addition, data are captured using the sensors, which permit determination of the degree of grease filter soiling, of the radiation power and also of the remaining baking time or the remaining roasting time. In addition, the PDA 701 can be used to configure the microwave oven 702 in different ways, for example to set the clock for the microwave oven 702, to set the heat level or an automatic timer for the hotplates in the microwave oven, or to select a microwave power program which is to be used and to select settings for particular dishes or drinks in order to heat them.

Figure 8:
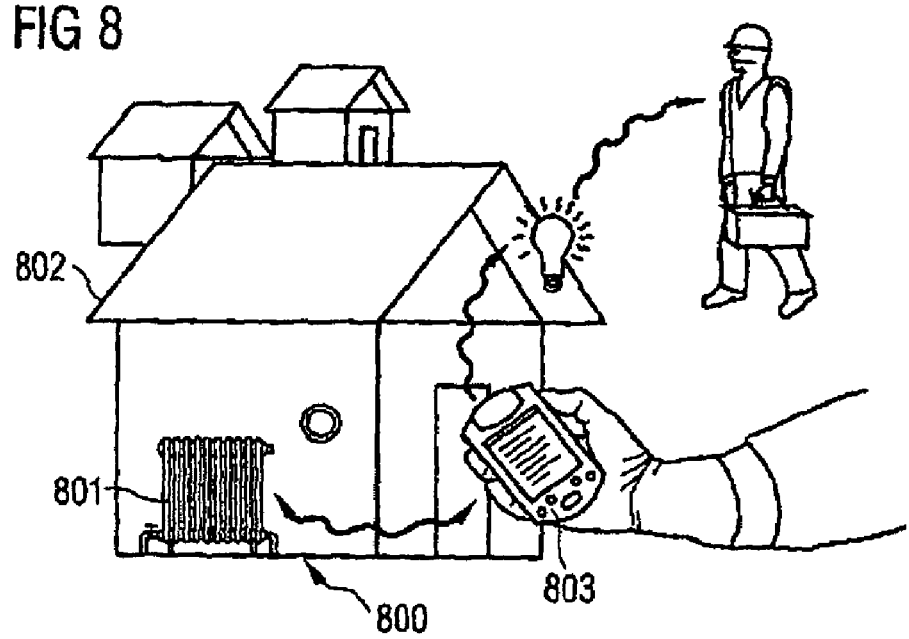
FIG. 8 illustrates a schematic view of a controllable radiator arrangement with an external control apparatus and a radiator according to a fourth exemplary embodiment of the invention.

FIG. 8 illustrates an industrial appliance arrangement 800 with one of a plurality of provided radiators 801 which are installed in a house 802. The radiator 801 is again controlled using a PDA 803 with a mobile radio communication interface which has been set up as appropriate.

For the radiators 801 or an entire heating system (not shown), sensors are provided for recording the heat power, any water conditioning which may be provided, for recording the state of the respective valves etc. In addition, sensors are provided for recording units of consumption and possibly for forwarding the units of consumption recording to a power generating company or to a power cost billing company. For example, according to this exemplary embodiment of the invention, the user of the PDA may be an employee at a power generating company or at a power cost billing company. According to this exemplary embodiment, the PDA 803 may be used to configure the heating settings (for the overall system and/or for a radiator 801) on the basis of the time of day, the day of the week, the outside temperature etc.

In terms of the basic data architecture, the radiator arrangement 800 has the same elements as the washing machine according to the first exemplary embodiment, which is why these elements are not described in detail.

In one alternative embodiment, a tumble dryer arrangement is provided which has the same configuration as the washing machine arrangement, with the difference that other sensors are provided in turn, which are tuned to the specific properties of the tumble dryer.

Thus, in this exemplary embodiment of the invention, sensors are provided for detecting faults in a capacitor in the tumble dryer or in a filter provided in the tumbler dryer, and also sensors for recording the lint filter state, the heating rods, the collecting tank (in the case of a condensation dryer) and possibly a remaining drying time in a tumble dryer arrangement which is in operation.

In addition, the external control apparatus is used to configure the tumble dryer in terms of drying duration, a drying program which is to be selected, aftertreatment or notification upon program end.

In addition, refrigerators and freezers can be set up as household appliances as appropriate in a manner corresponding to that for the washing machine arrangement in line with the first exemplary embodiment of the invention described above, or a television, a video recorder or a stereo system can be set up as an entertainment appliance in an appropriate manner.

By way of example, a factory machine can be set up as an industrial appliance in a manner corresponding to that described above.

Every appliance has specific maintenance functions and control functions which can be exported to the control apparatus using the transmission/reception device's system described above, as embedded system in the external control apparatus, and a respective specific software application.

The invention can clearly be seen in that maintenance functions and control functions for household appliances and industrial appliances are moved, according to the invention, out to more powerful computer terminals so that suitable user interfaces thereon can be used to operate the respective appliance using a radio communication interface. The technical basis for this is an inexpensive hardware system/software system comprising transceiver modules and a software application for the computer terminal.

The invention has the following particular advantages:

for all of said maintenance functions and control functions, the user can be provided with an extremely convenient interface for an appliance which is specifically intended for input/output. In this connection, it should be noted that the technology may be used not only by the purchaser of an appliance but also by the service personnel for maintaining the respective appliance.

Supplementary costs arising for the manufacturer of domestic appliance, particularly the household appliance, or industrial appliance are merely those for the (inexpensive) integrated transceiver module (transmission/reception device) and possibly those for the transceiver module in the computer terminal, if the latter does not already have one. This would also raise the sales price for the respective appliance only insignificantly.

The normal control elements for the domestic appliance or industrial appliance are not overloaded with special functions.

It should also be noted that the software application does not have to be limited to a graphical user interface for the direct use of (remote controlled) appliances, but rather may have application interfaces for interchanging data with other applications.

One example of this is the queries illustrated above which relate to states and units of consumption for a radiator, the units of consumption being made available to a service employee who is networked to the radiator's transmission/reception device, i.e. it is often no longer necessary for an engineer to pay an unnecessary visit.

The apparatuses needed in order to prevent this technology from being misused have not been explained in detail, but may be provided, by way of example, using cryptographic security mechanisms, for example using encrypted and/or digitally signed messages from the measuring instrument.

The invention claimed is:

1. A controllable appliance arrangement comprising:
an appliance having at least one sensor for recording at least one sensor variable which represents a state of the appliance;
a transmission/reception device coupled to the appliance, the transmission/reception device having a control unit, a first memory unit storing an appliance control program, a control interface, and a communication interface coupled to the control unit;
a second memory unit provided in the appliance or in the transmission/reception device for storing the recorded sensor variables;
an external control apparatus configured to receive and store the appliance control program, wherein the transmission/reception device automatically transmits the appliance control program to the external control apparatus when the appliance control program for controlling the appliance is not already stored in the external control apparatus, and the external control apparatus being able to execute the appliance control program stored therein to control the appliance;
wherein the transmission/reception device transmits the sensor variables to the external control apparatus.

2. The controllable appliance arrangement of claim 1, in which the appliance is a domestic appliance in the form of:
a refrigerator;
a stereo system;
a dishwasher;
a washing machine;
a tumble dryer;
a microwave oven; or
a stove.

3. The controllable appliance arrangement of claim 1, in which the appliance is an industrial appliance in the form of a heating system or a radiator.

4. The controllable appliance arrangement of claim 1, in which the sensor is set up as
a temperature sensor;
a filling level sensor;
a humidity sensor;
a gas sensor; and/or
a pressure sensor.

5. The controllable appliance arrangement of claim 1, comprising wherein the communication interface is configured as a radio communication interface.

6. The controllable appliance arrangement of claim 1, in which the first memory unit
is writable;
is nonwritable; or
is a memory having a first submemory and a second submemory, the first submemory being writable and the second submemory being nonwritable.

7. The controllable appliance arrangement of claim 6, in which the writable first memory unit or the first submemory is a random access memory.

8. The controllable appliance arrangement of claim 6, in which the nonwritable first memory unit or the second submemory is a read only memory.

9. The controllable appliance arrangement of claim 1, in which the first memory unit has a first submemory and a second submemory;
where the first submemory stores at least a portion of an appliance control program; and
where the second submemory stores another portion of the appliance control program or other data.

10. The controllable appliance arrangement of claim 9, in which the other data comprises:
information regarding a menu structure and/or information regarding a user interface.

11. The controllable appliance arrangement of claim 1, comprising wherein the transmission/reception device has an initialization unit which is set up such that the initialization unit can be used to set up a communication connection to the external control apparatus.

12. The controllable appliance arrangement of claim 11, comprising wherein the initialization unit is set up such that it can set up a communication connection to the external control apparatus by transmitting a signal to the latter.

13. The controllable appliance arrangement of claim 12, comprising wherein the initialization unit is set up such that it can set up a communication connection to the external control apparatus by accepting a signal from the external control apparatus.

14. The controllable appliance arrangement of claim 11, comprising wherein a communication protocol used for communication between the initialization unit and the external control apparatus is one of the following communication protocols:
Common Object Request Broker Architecture;
Simple Service Discovery Protocol;

Universal Plug and Play;
JXTA; or
Java Intelligent Network Infrastructure.

15. The controllable appliance arrangement of claim 1, comprising wherein the appliance control program is in the form of a JAVA code.

16. The controllable appliance arrangement of claim 1, comprising wherein the transmission/reception device is in the form of an embedded system.

17. The control system of claim 1, in which the external control apparatus comprises:
a workstation;
a personal computer;
a laptop;
a webpad;
a mobile radio telephone; or
a personal digital assistant.

18. The control system of claim 1, comprising:
the external control apparatus has a memory device for storing at least one appliance control program and also a processor which is set up such that it can execute the at least one appliance control program in order to control the appliance as a result.

19. A controllable appliance arrangement comprising:
an appliance having at least one sensor for recording at least one sensor variable which represents a state of the appliance;
a transmission/reception device coupled to the appliance, the transmission/reception device having a control unit, a first memory unit storing an appliance control program, a control interface, and a communication interface coupled to the control unit;
a second memory unit provided in the appliance or in the transmission/reception device for storing the recorded sensor variables; and
an external control apparatus having a memory device for storing the appliance control program and a processor which is set up such that it can execute the appliance control program in order to control the appliance as a result, the external control apparatus being configured to control the appliance via the control interface and via the communication interface by using the control unit;
wherein the communication interface can be used to transmits the appliance control program and the sensor variables to the external control apparatus, and wherein the external control apparatus has a storage-period management device which is set up such that for each appliance control program stored in the memory device it prescribes a time value which indicates the time after which an appliance control program stored in the memory device is/are erased from the memory device.

20. The control system of claim 19, in which a time value is prescribed by the storage-period management device on the basis of at least one of the following criteria:
how often the appliance control program has/have been executed in the past;
when the appliance control program was/were last executed;
what memory requirement the appliance control program has/have; and
what type of application the appliance control program is/are concerned with.

21. A controllable appliance arrangement comprising:
an appliance having at least one sensor for recording at least one sensor variable which represents a state of the appliance;
a transmission/reception device coupled to the appliance, the transmission/reception device having a control unit, a first memory unit storing an appliance control program, a control interface, and a communication interface coupled to the control unit;
a second memory unit provided in the appliance or in the transmission/reception device for storing the recorded sensor variables; and
an external control apparatus having a memory device for storing the appliance control program and a processor which is set up such that it can execute the appliance control program in order to control the appliance as a result, the external control apparatus being configured to control unit; and
an interrogation unit in the external control apparatus, wherein the interrogation unit is set up such that it can be used to ascertain whether the memory device already contains an appliance control program which is/are stored in the memory unit.

22. The control system of claim 21, wherein if the interrogation unit has been used to ascertain that the memory device already contains an appliance control program which is/are stored in the first memory unit, then the appliance control program is/are not transmitted to the external control apparatus.

23. A controllable appliance arrangement comprising:
an appliance having at least one sensor for recording at least one sensor variable which represents a state of the appliance;
a transmission/reception means coupled to the appliance, the transmission/reception means having a control unit, a first memory unit storing an appliance control program, a control interface, and a communication interface coupled to the control unit; and
a second memory unit provided in the appliance or in the transmission/reception means for storing the recorded sensor variables;
an external control apparatus configured to receive and store the appliance control program, wherein the transmission/reception means is configured transmitting the appliance control program to the external control apparatus when the appliance control program for controlling the appliance is not already stored in the external control apparatus, and the external control apparatus being able to execute the appliance control program stored therein to control the appliance;
wherein the transmission/reception means transmits the sensor variables to the external control apparatus.

* * * * *

UNITED STATES PATENT AND TRADEMARK OFFICE
CERTIFICATE OF CORRECTION

PATENT NO. : 7,110,836 B2
APPLICATION NO. : 10/930731
DATED : September 19, 2006
INVENTOR(S) : Thomas Sturm and Guido Stromberg It is certified that error appears in the above-identified patent and that said Letters Patent is hereby corrected as shown below:

Column 3, line 32, delete "to able" and insert in place thereof --to be able--.

Column 12, line 12, delete "form" and insert in place thereof --from--.

Column 16, line 46, delete "InfineonApplicatiorFamnilyjar" and insert in place thereof --InfineonApplicationFamily.jar-- .

Signed and Sealed this

Thirtieth Day of December, 2008

JON W. DUDAS
*Director of the United States Patent and Trademark Office*